United States Patent [19]
Yamazaki et al.

[11] 3,932,364
[45] Jan. 13, 1976

[54] PRODUCTION OF POLYAMIDES IN THE PRESENCE OF A PHOSPHORUS ACID ESTER AND AN ORGANIC BASE

[75] Inventors: Noboru Yamazaki; Fukuji Higashi, both of Tokyo, Japan

[73] Assignee: Sumitomo Chemical Company, Limited, Osaka, Japan

[22] Filed: Oct. 12, 1973

[21] Appl. No.: 405,906

[30] Foreign Application Priority Data
Oct. 17, 1972  Japan............................. 47-104297
Apr. 25, 1973  Japan............................. 48-47383
May 17, 1973  Japan............................. 48-55288

[52] U.S. Cl....... 260/78 R; 260/45.7 P; 260/47 CZ; 260/78 A
[51] Int. Cl.$^2$......................................... C08G 69/28
[58] Field of Search............. 260/78 R, 78 A, 47 CZ

[56]  References Cited
OTHER PUBLICATIONS

Floyd– Polyamide Resins, Second Edition, 1966, pp. 48–49.

*Primary Examiner*—Harold D. Anderson
*Attorney, Agent, or Firm*—Stevens, Davis, Miller & Mosher

[57]  ABSTRACT

Polyamides are produced by reacting a dicarboxylic acid with a diamine or polycondensing an amino acid in the presence of a phosphorous acid ester of the formula, $R^3.R^4.HPO_3$, wherein $R^3$ and $R^4$ may be the same or different and are individually an alkyl, aralkyl or aromatic group which may have at least one substituent, such as diphenyl phosphite, and an organic base such as pyridine.

11 Claims, No Drawings

PRODUCTION OF POLYAMIDES IN THE PRESENCE OF A PHOSPHORUS ACID ESTER AND AN ORGANIC BASE

This invention relates to a process for producing polyamides. More particularly, this invention relates to a process for producing polyamides useful as fibers, etc. by condensing dicarboxylic acids with diamines or polycondensing amino acids in the presence of a phosphorous acid ester and an organic base.

Polyamides useful as fibers, plastics, etc. have been produced by various processes, but conventional processes have many defects in that it is almost impossible to carry out polycondensation under extremely mild conditions, and there are some systems wherein almost no polyamidation takes place. When an aromatic diamine is used, no nylon salt is produced because of its weak basicity and since the polymerization rate of it is so small and side reactions take place at high temperatures, the polymerization method used for aliphatic diamines under reduced pressure and high temperatures cannot be applied to it. In order to obtain a polyamide useful as fibers excellent in heat resistance from an aromatic diamine, low-temperature solution polymerization or interfacial polymerization using a dicarboxylic acid dichloride has been developed. But the starting dicarboxylic acid dichloride is so expensive that this method is not suitable for commercial scale production. As a direct polymerization method of a dicarboxylic acid and an aromatic diamine, melt polymerization is proposed by Holmer et al (J. Polymer Sci., A-1, 10, 1547 (1972)), but this method is not suitable for practical production since the use of a thermally stable aromatic diamine is necessary. Ogata et al proposed a process for producing a polyamide using triphenyl phosphite-imidazole system (Polymer J. 2, 672 (1971)), but only a polyamide having very low molecular weight, i.e., $\eta$ sp/c = 0.1 – 0.3 in $H_2SO_4$, is obtained by this method. On the other hand, polyamino acids are produced by a N-carboxyanhydride process, an active ester process, or the like, which is an indirect process comprising converting an amino acid to an active form and polymerizing said active compound. But the conversion to an active form requires very complicated processes. A process for producing polypeptides from amino acids directly in polyphosphoric acid is proposed by Imoto et al (Makromol. Chem., 85, 173 (1965)), but the obtained polypeptide only has viscocity in dichloroacetic acid of 0.01.

It is an object of this invention to provide a process for producing polyamides by condensing dicarboxylic acid with diamines or polycondensing amino acids under extremely mild conditions. It is another object of this invention to provide a process for producing polyamides by using the systems which have been almost impossible to bring about polyamidation. It is still another object of this invention to provide a process for producing heat-resistant polymers by direct polymerization of a diamine with a polybasic acid without using an anhydride or other active derivative of polybasic acid. It is yet another object of this invention to provide a process for producing industrially useful polyamino acids. Further objects and advantages of this invention will be apparent to one skilled in the art from the accompany disclosure and discussion.

In accordance with the present invention, polyamides are produced by reacting a dicarboxylic acid of the formula, $$HOOC-R^1-COOH \qquad (I)$$

wherein $R^1$ is a straight- or branched-chain or cycloaliphatic hydrocarbon radical or an aromatic hydrocarbon radical, with a diamine of the formula, $$H_2N-R^2-NH_2 \qquad (II)$$

wherein $R^2$ is a straight- or branched-chain or cycloaliphatic hydrocarbon radical, an aromatic hydrocarbon radical, or a radical in which two or more radicals selected from the group consisting of the above-mentioned aliphatic and aromatic hydrocarbon radicals are bonded through —O— or —$SO_2$—, in the presence of a phosphorous acid ester of the formula, $$R^3 \cdot R^4 \cdot HPO_3 \qquad (III)$$

wherein $R^3$ and $R^4$ may be the same or different and are individually an alkyl, aralkyl or aromatic group which may have at least one substituent, and an organic base, or by polycondensing an amino acid of the formula, $$H_2N-R^5-COOH \qquad (IV)$$

wherein $R^5$ is a straight- or branched-chain or cycloaliphatic hydrocarbon radical, an aromatic hydrocarbon radical or a radical in which two or more radicals selected from the group consisting of the above-mentioned aliphatic and aromatic hydrocarbon radicals are bonded through —CONH— group, in the presence of a phosphorous acid ester of the formula, $$R^3 \cdot R^4 \cdot HPO_3 \qquad (III)$$

wherein $R^3$ and $R^4$ are as defined above, and an organic base.

As the phosphorous acid ester of the formula (III), the one in which $R^3$ and $R^4$ are the same such as dimethyl phosphite, diethyl phosphite, diisopropyl phosphite, di-n-butyl phosphite and diphenyl phosphite is used. Above all, diphenyl phosphite is most preferable.

As the dicarboxylic acid of the formula (I), that having normal or branched alkylene of 2 or more carbon atoms, preferably 2 – 15 carbon atoms, cycloalkylene of 4 or more carbon atoms, preferably 4 – 8 carbon atoms or phenylene as $R^1$ is preferable. Examples of these dicarboxylic acids are succinic acid, glutaric acid, adipic acid, pimelic acid, suberic acid, azelaic acid, sebacic acid, brassylic acid, thapsic acid, α-methylglutaric acid, α-methyladipic acid, 1,4-cyclohexanedicarboxylic acid, terephthalic acid, isophthalic acid, and the like.

As the diamine of the formula (II), that having normal or branched alkylene of 3 or more carbon atoms, preferably 3 – 15 carbon atoms, cycloalkylene of 3 or more carbon atoms, preferably 3 – 8 carbon atoms, phenylene, xylylene, lower alkylidenebiscycloalkylene wherein the alkylidene moiety has 1 – 4 carbon atoms and the cycloalkylene moiety has 3 – 8 carbon atoms, or lower alkylidenebisphenylene wherein the alkylidene moiety has 1 – 4 carbon atoms, or a radical in which two or more radicals selected from the group consisting of the above-mentioned aliphatic and aromatic hydrocarbon radicals are bonded through —O— or —$SO_2$— as $R^2$ is preferable. Examples of these diamines are trimethylenediamine, tetramethylenediamine, pentamethylenediamine, hexamethylenediamine, heptamethylenediamine, octamethylenediamine, nonamethylenediamine, decamethylenediamine, tridecamethylenediamine, 1,4-diaminocyclohexane, p-phenylenediamine, m-xylylenediamine, p-xylylenediamine, bis-(4-aminocyclohexyl)-methane, bis-(p-aminophenyl)-methane, di-(6-aminohexyl) ether, di-(6-amino-2-ethylhexyl) ether, di-(4- aminocylohexyl) ether, di-(4-aminophenyl) ether, 2,2-bis-[4-(4-aminophenoxy)phenyl]-propane

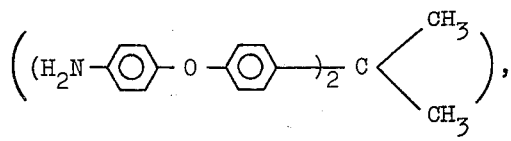

di-(6-aminohexyl) sulfone, di-(4-aminocyclohexyl) sulfone, di-(4-aminophenyl) sulfone, and the like. Among these compounds, an aromatic diamine such as p-phenylenediamine, m-xylylenediamine, p-xylylenediamine or bis-(p-aminophenyl)-methane is particularly preferable.

Examples of the amino acids of the formula (IV) are glycine, glycylglycine, sarcosine, dimethylglycine, alanine, phenylalanine, α-aminobutyric acid, α-aminoisobutyric acid, valine, leucine, isoleucine, norleucine, α-aminoenanthic acid, α-aminocaprylic acid, α-aminopelargonic acid, α-aminocapric acid, α-aminoundecanoic acid, α-aminolauric acid, α-aminomyristic acid, α-aminostearic acid, α-aminoarachic acid, α-aminocerotic acid, α-aminomelissic acid, β-alanine, β-aminobutyric acid, β-aminoisobutyric acid, β-aminovaleric acid, γ-aminobutyric acid, δ-aminovaleric acid, δ-aminovaleric acid, ε-aminocaproic acid, ω-aminoenanthic acid, ω-aminocaprylic acid, ω-aminopelargonic acid, ω-aminocapric acid, ω-aminoundecanoic acid, ω-aminnotridecanoic acid, 4-aminocyclohexanecarboxylic acid, p-aminobenzoic acid, p-(4-aminophenyl)benzoic acid, p-(4-aminobenzyl)benzoic acid, and the like. The amino acids may be used alone or as a mixture of two or more amino acids.

As the organic base, tertiary amines such as pyridine, 2-methyl pyridine, 3-methyl pyridine, 4-methyl pyridine, 2,6-dimethyl pyridine, and the like are preferable. Above all, pyridine is most preferable.

The organic base acts as an acid acceptor and a catalyst. When the organic base is a liquid, it can be used as a solvent and the use of other solvent is unnecessary, but if desired, other inert solvent such as acetonitrile, N-methyl-2-pyrrolidone or dimethylformamide may be used for the reaction.

The polyamidation reaction of the present invention can be preferably carried out at a temperature of from 20° to 200°C, more preferably from 40° to 150°C.

In the process of this invention, about equimolar of a dicarboxylic acid of the formula (I) and a diamine of the formula (II) can be preferably used. One equivalent or more of a phosphorous acid ester of the formula (III) can be preferably used per equivalent of the carboxyl group in the dicarboxylic acid or the amino acid used. It is preferable to use two moles or more of an organic base per mole of the dicarboxylic acid or the amino acid used.

More concretely, the process of the present invention can be carried out, for example, by adding a dicarboxylic acid of the formula (I) and a diamine of the formula (II) or adding an amino acid of the formula (IV) to a mixed solution obtained by adding a phosphorous acid ester of the formula (III) and an organic base to an inert solvent and conducting the reaction under desired reaction conditions to give a polyamide as a uniform solution or a precipitate. To the resulting polyamide solution, a non-solvent such as an alcohol is added to precipitate the polymer. The resulting precipitate can be purified by a conventional method.

According to the process of the present invention, since the condensation reaction or polycondensation reaction can be carried out under an extremely mild condition, the obtained polyamide shows excellent physical and chemical properties. In addition, the reaction of the present invention can be applied to a system which has been almost impossible by conventional processes. Further, the process of the present invention has the following advantages: Polyamides can be produced directly from diamines and dicarboxylic acids without using active derivatives thereof. Polymerization time can be shortened. Linear polyamino acids can be produced without ring-forming dimerization unlike conventional processes using free amino acids. Polyamino acids can be produced from free amino acids by one step without activating the amino groups and/or carboxyl groups thereof. Since the procedures are simple and the starting materials can be obtained easily, the process of the present invention is very suitable for commercial scale production of polyamides.

The invention is illustrated more particularly by way of the following examples but, as will be more apparent, is not limited to the details thereof.

EXAMPLE 1

Adipic acid and hexamethylene diamine (each 0.01 mole) were independently suspended in 30 ml of dimethylformamide. To the suspension, 4.9 g of diphenyl phosphite (0.02 mole) and 30 ml of pyridine were added and the reaction was carried out under reflux. The suspension became an uniform solution by heating. After about 30 minutes, white precipitate of the polyamide began to deposit. The reaction was completed after additional 3 hours' reflux. The precipitate was filtered off, washed and dried to give the polyamide "Nylon 66" as listed in Table 1. Further, a procedure similar to the above-described manner was carried out using pimelic acid and heptamethylene diamine to obtain "Nylon 77". The results were as shown in Table 1. In Table 1, the intrinsic viscosities of the polymers were measured in a 90% formic acid solution at 30°C.

Table 1

| Polyamide | Yield (%) | Melting point (°C) | Intrinsic viscosity |
|---|---|---|---|
| Nylon 66 | 68 | 252.5 | 0.20 |
| Nylon 77 | 58 | 200.7 | 0.15 |

EXAMPLE 2

To 0.0375 mole of diphenyl phosphite and 10 ml of pyridine, 40 ml of N-methyl-pyrrolidone (hereinafter referred to as NMP) was added and polycondensation reaction of 0.0125 mole of adipic acid with 0.0125 mole of the diamine as listed in Table 2 was carried out under the reaction conditions as listed in Table 2. The results were as shown in Table 2. In Table 2, the reduced viscosities ($\eta_{sp/c}$) of the polymers were measured at 30°C in a 0.5% solution of concentrated sulfuric acid.

Table 2

| Run No. | Diamine | Solvent NMP (ml.) | Reaction conditions Time (hrs.) | Reaction conditions Temp. (°C) | Yield of polymer (%) | ηsp/c |
| --- | --- | --- | --- | --- | --- | --- |
| 1 | ( H₂N —⟨⟩—)₂ CH₂ | 40 | 3 | 100 | 96 | 1.20 |
| 2 | do. | 40 | 6 | 100 | 94 | 1.22 |
| 3 | do. | 40 | 8 | 100 | 97 | 1.34 |
| 4 | H₂NCH₂—⟨⟩—CH₂NH₂ | 40 | 6 | 100 | Quantitatively | 0.22 |

EXAMPLE 3

Using a procedure similar to that described in Example 2, polycondensation reaction of succinic acid with

was carried out at 100°C for 6 hours. Yield of the polymer was 95%. $\eta_{sp/c}$ of the polymer was 0.20.

EXAMPLE 4

A procedure similar to that described in Example 2 was carried out but adipic acid was replaced by sebacic acid. The results were as shown in Table 3. In Table 3, $\eta_{sp/c}$ of the polymers were measured at 30°C in a 0.5% solution of concentrated sulfuric acid.

Table 3

| Run No. | Diamine | Solvent NMP (ml.) | Reaction conditions Time (hrs.) | Reaction conditions Temp. (°C) | Yield of polymer (%) | ηsp/c |
| --- | --- | --- | --- | --- | --- | --- |
| 1 | ( H₂N —⟨⟩—)₂ CH₂ | 40 | 6 | 100 | 97 | 1.45 |
| 2 | H₂NCH₂—⟨⟩—CH₂NH₂ | 40 | 8 | 100 | 70 | 0.17 |

EXAMPLE 5

Using a mixture of 0.0375 mole of diphenyl phosphite, 40 ml of N-methyl-pyrrolidone and 10 ml of pyridine, polycondensation reactions of 0.0125 mole of terephthalic acid with 0.0125 mole of various diamines as listed in Table 4 were carried out. The results were as shown in Table 4. The reduced viscosities ($\eta_{sp/c}$) of the polymers were measured as described in Example 2.

Table 4

| Run No. | Diamine | Solvent NMP (ml.) | Reaction conditions Time (hrs.) | Reaction conditions Temp. (°C) | Yield of polymer (%) | ηsp/c |
| --- | --- | --- | --- | --- | --- | --- |
| 1 | ( H₂N —⟨⟩—)₂ CH₂ | 40 | 6 | 100 | 79 | 0.23 |
| 2 | H₂N—⟨⟩—NH₂ | 40 | 6 | 100 | 100 | 0.12 |
| 3 | do. | 40 | 6 | 150 | 100 | 0.14 |

EXAMPLE 6

Using a procedure similar to that described in Example 4 Run No. 1, 0.0125 mole of isophthalic acid and 0.0125 mole of

were polycondensed to obtain a polyamide having $\eta_{sp/c}$ of 0.26 measured as described in Example 2 in 84% yield.

EXAMPLE 7

Using a mixture of 0.0375 mole of diphenyl phosphite, 10 ml of pyridine and a solvent as listed in Table 5, polycondensation reactions of 0.0125 mole of adipic acid with 0.0125 mole of various diamines as listed in Table 5 were carried out. The results were as shown in Table 5. $\eta_{sp/c}$ of the polymers were measured at 30°C in a 0.5% solution of concentrated sulfuric acid or NMP.

Table 5

| Run No. | Diamine | Solvent (ml) NMP | Solvent (ml) *1 DMF | Reaction conditions Time (hrs.) | Reaction conditions Temp. (°C) | Yield of polymer (%) | *2 ηsp/c |
|---|---|---|---|---|---|---|---|
| 1 | (H$_2$N—⟨⟩—)$_2$SO$_2$ | 40 | — | 3 | 100 | 79 | 0.11 (0.21) |
| 2 | do. | 40 | — | 6 | 100 | 86 | 0.28 |
| 3 | (H$_2$N—⟨⟩—)$_2$O | — | 60 | 3 | 100 | Quantitatively | 0.24 |
| 4 | do. | 120 | — | 6 | 100 | do. | 0.95 |
| 5 | (H$_2$N—⟨⟩—O—⟨⟩—)$_2$C(CH$_3$)$_2$ | — | 60 | 3 | 100 | do. | 0.06 (0.98) |

Note)
*1: DMF means dimethylformamide.
*2: The values in parentheses are measured in NMP.

Table 7

| Run No. | Amino acid | Solvent NMP (ml) | Pyridine (ml) | Reaction conditions Time (hrs.) | Reaction conditions Temp. (°C) | Yield of polymer (%) | ηsp/c |
|---|---|---|---|---|---|---|---|
| 1 | H$_2$N—⟨⟩—COOH | 40 | 10 | 6 | 100 | 79 | 0.10 |
| 2 | do. | 40 | 10 | 8 | 100 | 93 | 0.10 |

EXAMPLE 8

Using 0.0125 mole of sebacic acid as a dicarboxylic acid and 0.0125 mole of di-(4-aminophenyl) ether as a diamine, polycondensation reaction was carried out according to a procedure similar to that described in Example 7. The results were as shown in Table 6. $\eta_{sp/c}$ of the polymer was measured at 30°C in a 0.5% solution of concentrated sulfuric acid.

Table 6

| Run No. | Diamine | Solvent NMP(ml) | Reaction Time (hrs.) | Reaction Temp. (°C) | Yield of polymer (%) | ηsp/c |
|---|---|---|---|---|---|---|
| 1 | (H$_2$N—⟨⟩—)$_2$O | 80 | 6 | 100 | 92 | 0.34 |

EXAMPLE 9

Using 0.0188 mole of diphenyl phosphite, 10 ml of pyridine as an organic base and 40 ml of N-methylpyrrolidone as a solvent, polycondensation reaction of 0.0125 mole of p-aminobenzoic acid was carried out. The results were as shown in Table 7. $\eta_{sp/c}$ of the polymers were measured at 30°C in a 0.5% solution of concentrated sulfuric acid.

EXAMPLE 10

Polycondensation reaction of p-aminobenzoic acid was carried out according to the procedure of Example 9 Run No. 1 except for employing reaction temperature of 130°C. The polymer having $\eta_{sp/c}$ of 0.16 which was measured at 30°C in a 0.5% solution of concentrated H$_2$SO$_4$ was obtained in 98% yield.

EXAMPLE 11

Using 0.0375 mole of diphenyl phosphite, 10 ml of pyridine as an organic base and 50 ml of a solvent as listed in Table 8, polycondensation reactions of 0.025 mole of various amino acids as listed in Table 8 were carried out. The results were as shown in Table 8.

Table 8

| Run No. | Amino acid | Solvent | Time (hrs.) | Temp. (°C) | ηsp/c (0.5 %) in $H_2SO_4$ | ηsp/c (0.5 %) in $Cl_2CHCOOH$ | Yield (%) | Note[1] |
|---|---|---|---|---|---|---|---|---|
| 1 | Glycine | NMP | 6 | 45 | 0.06 | 0.114 | 24 | Crude yield 47% (pptd. in acetone) |
| 2 | do. | do. | 22 | 45 | — | 0.114 | 42 | Crude yield 76% (pptd. in acetone) |
| 3 | Glycine.HCl | do. | 6 | 45 | 0.06 | 0.11 | 24 | Crude yield 47% (pptd. in acetone) |
| 4 | Glycylglycine | do. | 6 | 45 | 0.08 | 0.115 | 60 | |
| 5 | β-Alanine | do. | 6 | 60 | 0.184 | 0.17 | 29 | Crude yield 84% (pptd. in acetone) |
| 6 | do. | DMF[2] | 3 | 100 | — | 0.198 | 34 | |
| 7 | D,L-Alanine | NMP | 22 | 45 | — | 0.11 | 23 | |
| 8 | do. | do. | 5 | 100 | — | 0.11 | 25 | |
| 9 | L-Phenylalanine | do. | 20 | 45 | — | 0.05 | 100 | The yield is crude yield. (pptd. in water) |
| 10 | do. | do. | 5 | 100 | — | 0.05 | 93 | do. |

[1] "pptd." means precipitated.
[2] DMF means dimethylformamide.

What is claimed is:

1. A process for producing a fiber-forming polyamide which comprises reacting a dicarboxylic acid of the formula

HOOC—R¹—COOH wherein $R^1$ is a straight or branched-chain aliphatic hydrocarbon radical, with a diamine of the formula $H_2N-R^2-NH_2$ wherein $R^2$ is an aromatic carbocyclic radical, or a radical in which two or more aromatic carbocyclic radicals are bonded through —O—, in the presence of a phosphorous acid ester of the formula, $R^3R^4HPO_3$ wherein $R^3$ and $R^4$ may be same or different and are individually an alkyl, aralkyl or aromatic group and in the presence of an organic base selected from the group consisting of pyridine, 2-methyl pyridine, 4-methyl pyridine and 2,6-dimethyl pyridine, wherein one equivalent or more of the phosphorous acid ester is used per equivalent of the carboxyl group in the dicarboxylic acid and two moles or more of the organic base per mole of the dicarboxylic acid is used.

2. A process according to claim 1, wherein the dicarboxylic acid is adipic acid or sebacic acid.

3. A process according to claim 1, wherein the diamine is bis-(p-aminophenyl)-methane.

4. A process according to claim 1, wherein the phosphorous acid ester is diphenyl phosphite and the organic base is pyridine.

5. A process according to claim 1, wherein the reaction is carried out at a temperature of from 20° to 200°C.

6. A process according to claim 1, wherein about equimolar of the dicarboxylic acid and the diamine are used.

7. A process according to claim 1 wherein adipic acid is reacted with a diamine as set forth in claim 1 wherein $R_2$ is an aromatic hydrocarbon radical.

8. A process according to claim 1 wherein adipic acid is reacted with bis-(p-aminophenyl)-methane.

9. A process according to claim 1, wherein the dicarboxylic acid is adipic acid, suberic acid or sebacic acid, the diamine is bis-(p-aminophenyl)-methane, di-(4-aminophenyl) ether or 2,2-bis-[4-(p-aminophenoxy)-phenyl]-propane and the phosphorous acid ester is dimethyl phosphite, diethyl phosphite, diisopropyl phosphite, di-n-butyl phosphite or diphenyl phosphite.

10. A process according to claim 1, wherein sebacic acid is reacted with bis-(p-aminophenyl)-methane.

11. A process according to claim 1, wherein suberic acid is reacted with bis-(p-aminophenyl)-methane.

* * * * *